United States Patent

Przywara

(10) Patent No.: US 7,685,098 B2
(45) Date of Patent: Mar. 23, 2010

(54) ESTIMATING THE SIZE OF A JOIN BY GENERATING AND COMBINING PARTIAL JOIN ESTIMATES

(75) Inventor: Joseph Przywara, Verona, WI (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

(21) Appl. No.: 11/297,301

(22) Filed: Dec. 8, 2005

(65) Prior Publication Data

US 2007/0136317 A1      Jun. 14, 2007

(51) Int. Cl.
G06F 7/00       (2006.01)

(52) U.S. Cl. ................................ 707/2; 707/100; 707/4

(58) Field of Classification Search .................. 707/100, 707/2, 4
See application file for complete search history.

(56) References Cited

U.S. PATENT DOCUMENTS

| 6,865,567 | B1 * | 3/2005 | Oommen et al. ............... 707/2 |
| 7,277,873 | B2 * | 10/2007 | Brown et al. ................. 706/45 |
| 2003/0167272 | A1 * | 9/2003 | Sinnott, Jr. ................. 707/100 |
| 2004/0010488 | A1 * | 1/2004 | Chaudhuri et al. ............. 707/3 |
| 2004/0260675 | A1 * | 12/2004 | Bruno et al. ................... 707/2 |
| 2005/0091238 | A1 * | 4/2005 | Zane et al. ................... 707/100 |

OTHER PUBLICATIONS

"How Fuzzy Query Works" by Sonalysts, http://fuzzy.sonalysts.com/fuzzysql1.htm, (2003).
"How Fuzzy Query Works (Part 2)" by Sonalysts, http://fuzzy.sonalysts.com/fuzzysql2.htm, (2003).
"How Fuzzy Query Works (Part 3)" by Sonalysts, http://fuzzy.sonalysts.com/fuzzysql3.htm, (2003).
"How Fuzzy Query Works (Part 5)" by Sonalysts, http://fuzzy.sonalysts.com/fuzzysql5.htm, (2003).
"How Fuzzy Query Works (Part 6)" by Sonalysts, http://fuzzy.sonalysts.com/fuzzysql6.htm, (2003).

* cited by examiner

*Primary Examiner*—Tim T. Vo
*Assistant Examiner*—Mahesh H Dwivedi
(74) *Attorney, Agent, or Firm*—Wood, Herron & Evans, LLP; James R. Nock

(57) ABSTRACT

A program product, an apparatus, and a method of estimating a join size by generating partial join estimates and combining the partial join estimates. In particular, robust formulas are provided that may result in more consistent estimates and fewer inaccuracies. Inconsistencies and inaccuracies are generally present in conventional join size estimation techniques, however, consistent with the invention, consistent join size estimates may be generated resulting in improved access plan selection during optimization.

16 Claims, 2 Drawing Sheets

ESTIMATING THE SIZE OF A JOIN BY GENERATING AND COMBINING PARTIAL JOIN ESTIMATES

FIELD OF THE INVENTION

The invention relates to database management systems, and in particular, to estimating the size of a join.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

Furthermore, significant development efforts have been directed toward query "optimization," whereby the execution of particular searches, or queries, is optimized in an automated manner to minimize the amount of resources required to execute each query. A query optimizer typically generates, for each submitted query, an access plan. In generating an access plan, a query optimizer typically creates multiple potential access plans, and selects the best among those potential access plans based upon the "cost" of each plan. The cost of each plan represents the amount of resources expected to be utilized by the plan (typically expressed in the expected amount of time to execute), and as such, selecting the plan with the lowest cost typically results in the most efficient (and quickest) execution of a query.

One area in which query optimization has been problematic is in connection with fuzzy logic searching. In general, the introduction of fuzzy logic principles to query databases has produced query results that better reflect the intentions of users conducting the queries. Generally, before fuzzy logic, a user had to arbitrarily quantify and/or characterize their intentions via their query, often leading to query results that did not adequately reflect their intentions. For instance, a user may intend to identify "good" employees in a department, e.g., employees with good sales record and a good complaint record. Generally, the higher the sales and the lower the number of unsubstantiated complaints against the employee the better the employee. Nonetheless, without fuzzy logic, the user may have to indicate the minimum sales that the user considers to be a good sales amount, e.g., a sale amount of $50,000 or above, and a number of unsubstantiated complaints the user considers to be a good number of unsubstantiated complaints, e.g., less than or equal to five complaints. The search might be represented as query1: SELECT * FROM EMPLOYEES WHERE SALES>=50000 AND NUM_UNSUBSTANTIATED_COMPLAINTS<=5 ORDER BY SALES DESC, NUM_UNSUBSTANTIATED_COMPLAINTS ASC With the query above, which does not incorporate fuzzy logic principles, the user will generally receive exactly what was asked for, mainly a list of employees whose sales are $50,000 or above and the number of their unsubstantiated complaints is less than or equal to five. However, such a search may omit employees with sales of $49,999.99 with zero unsubstantiated complaints or an employee with six unsubstantiated complaints but sales of $100,000, both of whom the user may consider to be good employees. Furthermore, within the results, the user may consider an employee with sales of $50,000 and zero unsubstantiated complaints to be a better employee than one with sales of $51,000 and four unsubstantiated complaints, but such many not be reflected. Instead, the principles of fuzzy logic may be used to process database queries to limit the user from the need to make arbitrary determinations about what constitutes a good employee via the sales and the number of unsubstantiated complaints conditions.

Generally, fuzzy logic allows the sales condition to be expressed along a continuous function of sales and the number of unsubstantiated complaints condition to be expressed along a continuous function of number of unsubstantiated complaints. Group membership along each corresponding continuous function may measured by values in the range 0 to 1. Typically, a value of "1" indicates 100% membership in the group meaning the condition is completely satisfied and a value of "0" indicates 0% membership in the group meaning the condition is not generally satisfied. Values falling between 0 and 1 indicate some membership in the group and may be determined by using algorithms. A value of "0.9876", for example, may indicate a higher membership in the group than a value of "0.1234".

Thus, with regard to the previous example, membership in the sales group may be represented with a continuous function where sales more than $100,000, for example, indicates membership of 1 and sales of less than $40,000, for example, indicate a membership of 0. Similarly, membership in the unsubstantiated complaints group may be represented with a continuous function where if an employee has less than two unsubstantiated complaint, for example, then his or her membership in the group is 1. However, if the number of unsubstantiated complaints is more than ten, for example, then the membership is 0. For queries with more than one condition such as this, each group membership may be determined and the weighted average of the group membership values may be used, or the minimum and/or maximum group membership value may be used depending on the operation in a query, e.g., and operation, or operation, not operation, etc, to generate the user's list of good employees. Generally, the list of employees may better proximate the user's intentions of what is a good employee. For instance, employees that would typically have been omitted with the usual query illustrated above may be included, and those employees included are typically ordered based upon how they relatively meet both condition.

As noted above, the introduction of fuzzy logic principles into a database environment can complicate query optimization. In particular, it may be helpful during optimization to estimate the number of records that may be returned when a given condition in a predicate of a database query is processed. Based upon the estimate, the optimizer may be able to better compare the access plans and select the best plan under the runtime conditions.

With that end in mind, the data in a table may be sorted and placed into buckets forming a histogram and descriptive information about the buckets of the histogram may be stored. For instance, the high and low values of the buckets, the number of records in each bucket, and the high and low values of the table may be stored. Thus, optimizers may rely on formulas incorporating the stored data to estimate the number of records that may be returned for a given criteria. Some optimizers also use the formulas to make additional estimates. For example, a formula to estimate the number of records that may be returned that are less than x (e.g., the value of x may be in a predicate of a database query such as table1.field1<x) may be rewritten to estimate the number of records that may be returned that are less than or equal to x.

Generally, these techniques may be appropriate to estimate the number of records that may be returned from a single table for a given criteria; however, it has been found that estimating the number of records that may be returned after a join operation between two tables, also known as a join size, may introduce inaccuracies and/or inconsistencies. As a result, an optimizer may select a suboptimal access plan under the runtime conditions based upon the inaccuracies and inconsistencies. A join is typically an operation used to combine data from two or more different tables according to some criteria. Join operations are common in database queries and are routinely used to access data from relational databases. In particular, the mathematical properties, e.g., (A<B):=1−(A>=B) or (A<=B):=(A<B)+(A=B), used by optimizers via the formulas to estimate join sizes for additional relationships such as these inequalities are applied to values that are generally "fuzzy" in nature. Thus, estimating join sizes for these inequalities is akin to query1 hereinabove, generally leading to inadequate results.

In particular, in modern cost based query optimization, join size estimates (and access plans) used in connection with previous database queries are stored and reused for faster access and recovery. However, reusing estimates in this context becomes problematic in conventional designs. For instance, if a result was already available for A<B as well as for A=B, it would not be sound in conventional designs to combine these results to estimate a result for A>B, because using conventional calculations |A<=B|+|A>B|< >|Cross Product|. Instead, it is possible that |Cross Product|−|A<=B| may result in a value less than, or very close to zero. Negative numbers and numbers close to zero often cause radically different behavior than slightly larger numbers, and are thus undesirable. Furthermore, even when the formulas are not rewritten by optimizers to estimate additional relationships, inconsistencies may result if a user reformulates the database query.

A need therefore exists in the art for an improved approach of estimating a join size, and in particular, an improved approach for estimating join sizes that results in more consistent estimates.

SUMMARY OF THE INVENTION

The invention addresses these and other problems associated with the prior art by providing an apparatus, program product and method that calculate a join size estimate by generating partial join estimates and combining the partial join estimates. The manipulation of the partial join estimates may be used to generate consistent join size estimates for a given condition, and thus enable the selection of an access plan that may be more optimal under runtime conditions.

Certain embodiments consistent with the invention may calculate the partial join estimates for a given criteria from merge regions associated with histograms of the tables to be joined. Furthermore, the partial join estimates may be combined to calculate a join size estimate. In particular, join size estimates may be generated to estimate the number of records that may be returned when the data values of a first table are equal to, less than, less than and/or equal to, more than, and/or more than and/or equal to data values of a second table.

The partial join estimates may be generated by scaling a density for a region or bucket from a histogram of a first table associated with a merge region and a density for a region or bucket from a histogram of a second table associated with the merge region by the width of the merge region. The density may be calculated by dividing a count of the bucket by the width of the bucket. The count of the bucket represents the number of data values in the bucket. Fuzzy logic principles may be incorporated into scaling the density, thus, the densities may be values within 0 and 1. As a result, the partial join estimates, and ultimately the join size estimate generated by combining the partial join estimates, may be more consistent as they may be based upon the scaled densities that incorporate fuzzy logic principles.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter calculate a join size estimate by generating partial join estimates and combining the partial join estimates. A join size estimate may estimate, for example, the number of records that may be returned when the data values of a first table are equal to, less than, less than or equal to, more than, and/or more than or equal to data values of a second table. Generally, the formulas described below to estimate join sizes are robust in nature, i.e., they produce consistent estimates. Robust formulas to calculate join size estimates for each of the aforementioned relationships are included herein and will be discussed in connection with routine 60 in FIG. 3.

As noted above, a join size estimate maybe based upon the combination of multiple partial join estimates. A partial join estimate in this regard may be any intermediate estimate calculated using a merge region in generating the join size estimate. A merge region may be any region formed from at least a portion of a histogram of a table to be joined. In the illustrated embodiments, a plurality of merge regions may be generated from histograms of tables to be joined, and there may be more merge regions than there are buckets in the histograms of the tables to be joined. Generally, a merge region as defined in the illustrated embodiment may include a low range and a high range, with the low range being exclusive and the high range being inclusive. Additionally, the high range of a merge region may be the low range of a next merge region. The low range and the high range of a merge region may overlap a region of a histogram of a table to be joined, i.e., the low range and/or high range of a merge region may be a bound from a bucket of a histogram of a table to be joined. For instance, the low range of a merge region may be the lower bound of a bucket of a first histogram of a first table to be joined and the high range of the merge region may be an upper bound of a bucket of a second histogram of a second table to be joined. Additionally, the low and the high range of a merge region may be from a single histogram of a table to be joined. For instance, the low and high range of a merge region may coincide with the lower and upper bounds of a bucket of a histogram, but need not be the case in embodiments consistent with the invention. The generation of merge regions is discussed further in connection with routine 60 in FIG. 3.

Furthermore, for simplicity, reference is made to a table, e.g., histogram of a table, joining tables, and/or similar, throughout this application; however, the reader should be aware that the reference may also refer to a specific column of the table, as will be appreciated by one of ordinary skill in the art.

Figure 1:
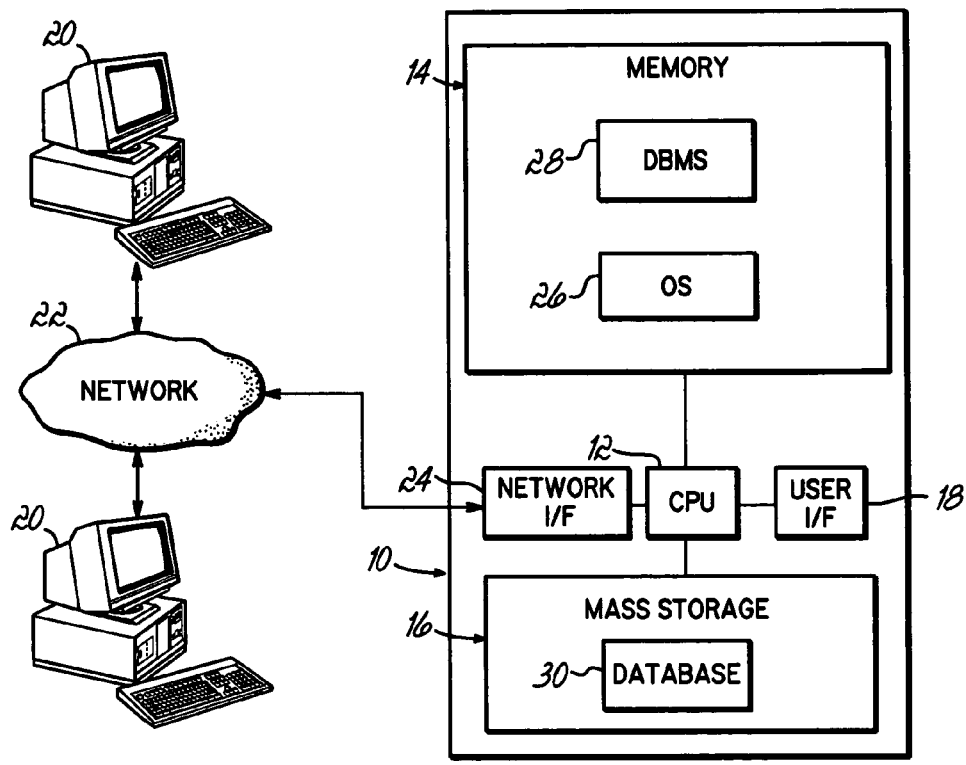
FIG. 1 is a block diagram of a networked computer system incorporating a database management system within which is implemented query optimization consistent with the invention.

Turning now to the Drawings, wherein like numbers denote like parts throughout the several views, FIG. 1 illustrates an exemplary hardware and software environment for an apparatus 10 suitable for implementing a database management system incorporating query optimization consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
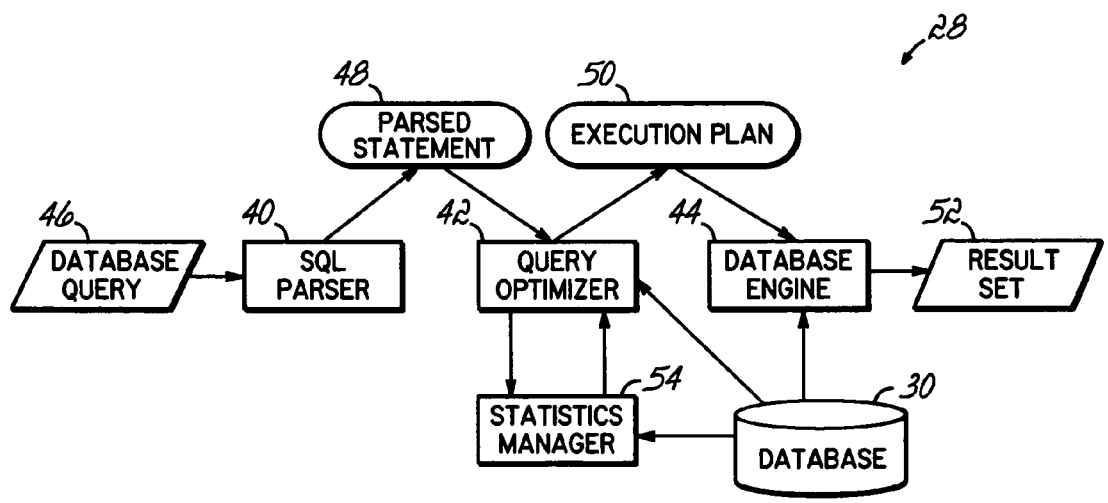
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated. Once generated, the execution plan is forwarded to database engine 44 for execution of the database query on the information in database 30. The result of the execution of the database query is typically stored in a result set, as represented at block 52. To facilitate optimization, a statistics manager 54 may be incorporated into DBMS 28.

Generally, a DBMS in embodiments consistent with the invention may be able to determine a plurality of merge regions from the histograms of tables to be joined. Furthermore, the DBMS may be able to calculate partial join estimates for each merge region and combine the partial join estimates. The partial join estimates may be based upon robust formulas included herein.

Figure 3:
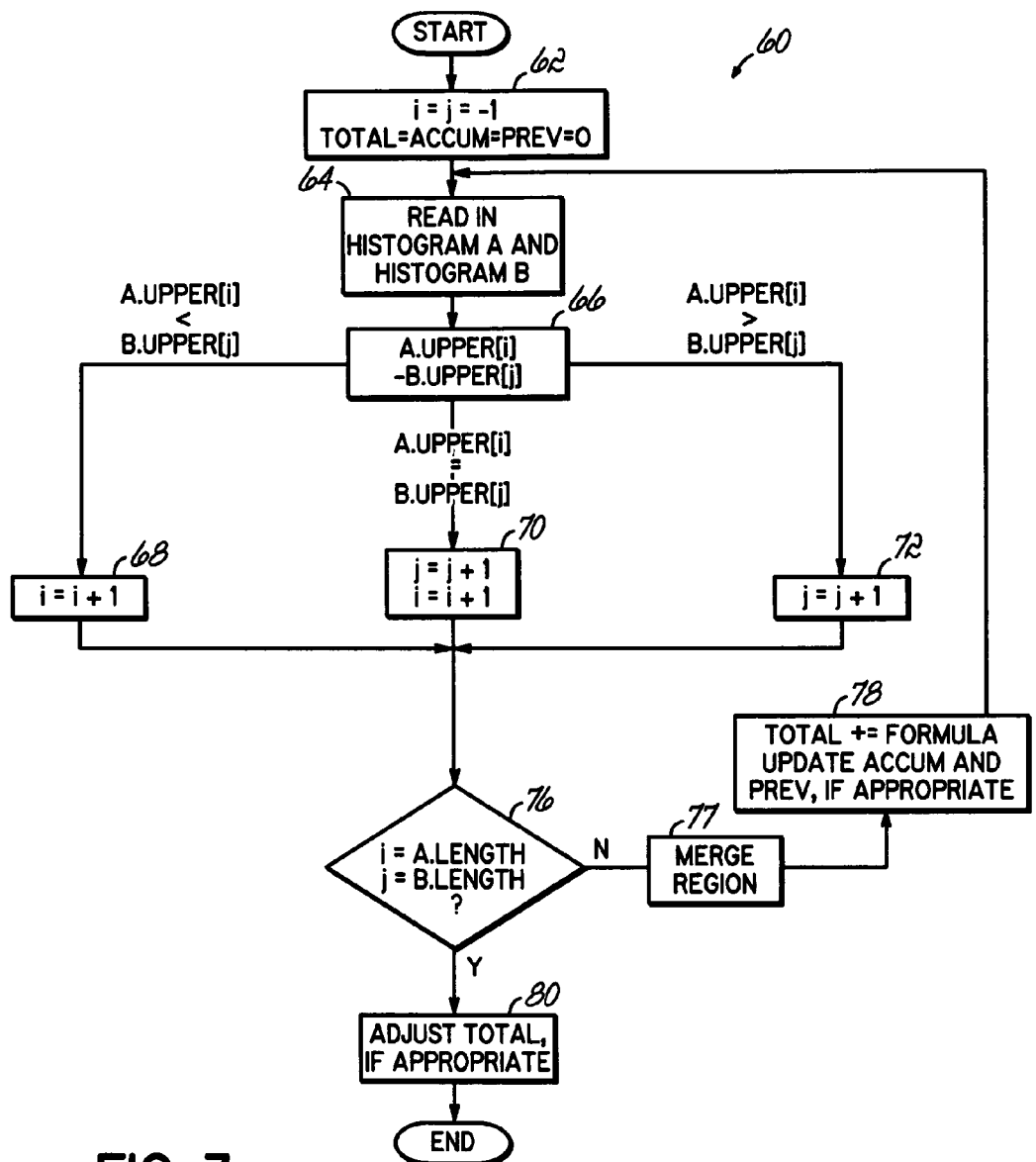
FIG. 3 is a flowchart illustrating the program flow of one implementation of a join size estimation routine for use in the database management system of FIG. 1.

FIG. 3 next illustrates routine 60, an exemplary implementation of a join size estimating routine that determines the merge regions, calculates partial join estimates for the merge regions, and combines the partial join estimates to generate a join size estimate that may be used by a DBMS for optimization. The tables to be joined may be ascertained from a database query. In particular, routine 60 generates estimates using robust formulas which incorporate fuzzy logic principles.

Turning to routine 60, routine 60 relies upon the existence of histograms for the tables to be joined. In particular, a histogram A for Table A and histogram B for Table B, the buckets of histogram A and histogram B, and the lower and upper bounds of histogram A and histogram B are referenced and manipulated throughout routine 60. Any technique known to those of ordinary skill in the art may be used to generate the histograms.

Referring to block 62, a variety of variables are referenced and initialized in block 62. Variable i is used to loop through the buckets of histogram A and variable j is used to loop through the buckets of histogram B. In particular, A.upper[i] and B.upper[j] represent arrays of buckets of histograms A and B, respectively. Generally, A.upper[i] and B.upper[j] may be used to iterate through the lower and/or upper bounds of the buckets of histogram A and B, respectively. In particular, variables i and j are initialized with the value of negative one. A.upper[-1] represents the lower bound of the first bucket of histogram A whereas B.upper[-1] represents the lower bound of the first bucket of histogram B. There may be no limit to A.upper[i] and B.upper[j], i.e., A.upper[i]=$\infty$ and/or B.upper[j]=$\infty$. Furthermore, A.upper[A.length] may equal infinite, i.e., A.upper[A.length]=$\infty$, and/or B.upper[B.length] may equal infinite, i.e., B.upper[B.length]=$\infty$, wherein length represents the number of buckets of the respective histogram. Thus, there may be an infinite number of bounds in a histogram.

The total variable represents a running total of the partial join estimates calculated for each merge region, and the accum variable represents an accumulator for inequalities. The accum variable generally represents an estimate of how many values in histogram A are smaller than the low range of a merge region (discussed in greater detail in connection with block 78). The prev variable generally represents the cross product between values in histogram B in a merge region and the values in histogram A from the accum variable (discussed in greater detail in connection with block 78). The accum and/or prev variables may be used to estimate the partial join estimates and the join size for inequalities, e.g., $<$, $<=$, $>$, and/or $>=$. The variables total, accum, and prev may be initialized with the value of zero in block 62.

Next, histogram A and histogram B may be read in, e.g., from memory, in block 64. For instance, as histograms A and B are generated, the histograms may be stored in memory using any technique known to those of ordinary skill in the art and read in at block 64. Histogram A and histogram B may be read in as needed.

Next, in block 66, the bounds (i.e., lower bound and/or upper bound) of the buckets of histograms A and B are compared to each other, and based upon the comparison, control may pass to block 68, block 70, or block 72. Of particular note, in the first iteration of the loop, which extends blocks 64 to 78, the variables i and j are initially set to negative one, i.e., A.upper[-1] and B.upper[-1], because the variables i and j were initialized as negative one in block 62. Therefore, A.upper[-1] refers to the lower bound of the first bucket of histogram A and B.upper[-1] refers to the lower bound of the first bucket of histogram B.

Returning to block 66, the comparison of A.upper[i] and B.upper[j] may be performed to determine the lowest bound value. If the bound value represented by A.upper[i] is less than the bound value represented by B.upper[j], then the lowest bound value is that of A.upper[i] and control passes to block 68. Additionally, the variable i is incremented by one in block 68. On the other hand, referring back to block 66, if the bound value represented by A.upper[i] is greater than the bound value represented by B.upper[j], then the lowest bound value is that of B.upper[j] and control passes to block 72. In block 72, the variable j may be increased by one. However, if the bound value represented by A.upper[i] is equal to the bound value represented by B.upper[j], then the lowest bound value is that of A.upper[i] or B.upper[j] and control passes to block 70. In block 70, the variables i and j may each be increased by one. The variables are generally increased by one such that in the next iteration of the loop, the bound value of histogram A and B may be compared. For instance, by increasing the variable i by one, the next bound value of histogram A may be accessed via A.upper[i] and compared to the bound value of B.upper[j], either the new bound value, e.g., if j was incremented, or the same bound value of B.upper [j]. Similarly, by increasing the variable j by one, the next bound value of histogram A may be accessed via B.upper[j] and compared to the bound value of A.upper[i], either the new bound value, e.g., if i was incremented, or the same bound value of A.upper[i].

Next, control passes from block 68, 70 or 72 to block 76. Block 76 determines whether the loop concludes. In particular, in block 76, it is determined if the variable i equals A.length and the variable j equals B.length. A.length and B.length represent the number of buckets in histogram A and histogram B, respectively. If the condition of block 76 has been met, control passes to block 80 and then the routine concludes. In block 80, the value of total generally represents a combination of partial join estimates, however, the value of total may be adjusted in block 80 depending upon the formula used and/or join size estimate sought. If not met, control passes to block 77 to generate a merge region including its low range and high range, and then to block 78 to calculate a partial join estimate for that merge region, and combine the partial join estimate with the total value.

Figure 4:
FIG. 4 is a diagram of one implementation of histogram A for Table A and one implementation of histogram B for Table B, and the merge regions that may be generated therefrom.

To further illustrate the concept of a merge region, FIG. 4 generally illustrates the merge regions that may be generated from one exemplary implementation of histograms A and B. Histogram A is illustrated with four buckets, while Histogram B has six buckets. Each pair of vertical lines illustrates a bucket in histogram A and B. Furthermore, ten merge regions are illustrated based upon histogram A and B. Each pair of vertical lines illustrates a merge region.

Returning to FIG. 3, the lowest bound value determined from the comparison in block 66 may become a low range or high range of the merge region in block 77. In other words, the merge region may overlap a region or bucket of histogram A and/or histogram B. Generally, the merge region may be composed of an exclusive low range and an inclusive high range, e.g., (−1, 0]. Whether the lowest bound value determined from block 66 may be designated as the low range or the high range of the merge region may depend upon whether the merge region already has a low range. Additionally, in embodiments consistent with the invention, the high range of a merge region may become the low range of the next merge region. Those of ordinary skill in the art may appreciate that generally, the merge regions can be constructed on the fly by iterating between both histogram A and B using the following algorithm:

```
HR(M) = Min(UB(currA), UB(currB))
LR(M) = Min(LB(currA), LB(currB))
do_calculations
   if UB(currA) > UB(currB)
      nextB(currB);
   else if UB(currA) < UB(currB)
      nextA(currA);
   else
      nextA(currA); nextB(currB)
```

In particular, M is a merge region, currA represents the current bound of histogram A, and currB is the current bound of histogram B. UB represents the upper bound and LB represents the lower bound. HR represents the high range and LR represents the low range. NextA and nextB represent the next bound of histogram A and B, respectively.

It is worth noting that during the first iteration of the loop, the first merge region to be generated may not have a low range or a high range. Thus, the lowest bound value determined from block 66 may be the low range of the first merge region. Furthermore, during the second iteration of the loop, the subsequent lowest bound value determined from block 66 may become the high range of the first merge region. Thus, the creation of the first merge region, and its low and high range, may rely upon two iterations of the loop. Additionally, those of ordinary skill in the art may realize that after the first merge region is created, after two iterations of the loop, the high range of the first merge region may become the low range of the next merge region and the next lowest bound value determined from block 66 may become the high range of the next merge region, and so on. Thus, a low range of a merge region may be the high range of the previous merge region and the high range of the merge region may be the next lowest bound value determined from block 66.

As an example, during the first iteration of the loop, the lowest bound value determined by block 66 may be 2; thus, the first merge region may have a low range of 2, i.e., (2,_, in block 77. During the second iteration of the loop, the lowest bound value determined by block 66 may be 4; thus, the high range of the first merge region may be 4, i.e., (2, 4], in block 77. During the third iteration, the low range of the next merge region may be the high range of the previous merge region, i.e., 4, and the high range of the merge region may be the next lowest bound value determined in block 66, e.g., 9. Thus, during the third iteration, the merge region may be (4, 9] in block 77.

Additionally, it is worth noting that the order of the loop may be changed. For instance, the actions of block 77 may be performed after block 66 and before blocks 68, 70, and/or 72.

Next, in block 78 a partial join estimate may be calculated for the merge region and the partial join estimate combined with the total variable. As mentioned hereinabove, the first merge region may not be generated until the second iteration; thus, block 78 may be skipped during the first iteration of the loop. Nonetheless, depending on the type of join size estimate sought, one of five formulas presented hereinafter may be used to calculate the partial join estimate for the merge region. Additionally, more than one partial join estimate may be calculated in block 78. For instance, in the example illustrated below, three join size estimates and the partial join estimates leading to the join size estimates are illustrated in Chart III and Chart V. Thus, there may be more than one total variable, e.g., a different total value may be updated with partial join estimates for each join size estimate.

Additionally, it is worth noting that some formulas may be separated into two parts. For instance, the first part may be used to generate a partial join estimate, while the latter part may be used after all the partial join estimates are combined. Whether the formula may be separated two parts may depend upon the join size estimate sought, e.g. the < and <= formulas may be separated. However, the formulas need not be separated. Nonetheless, the formulas generally rely on the even distribution assumption and fuzzy logic principles. Thus, the formulas avoid generating densities outside of [0, 1] and may result in more consistent estimates and an increase in overall accuracy. After the partial join estimate is generated with one of the formulas and combined with the corresponding total variable, control passes to block 64. Each formula will next be discussed individually.

If the join size estimate sought is an estimate of the number of data values of Table A that are equal to data values of Table B, a partial join estimate may be generated in block 78 for the merge region of block 77 based upon the following formula:

$$A=B: \text{foreach}(currM,M)\text{total}+=|currA|*|currB|*\text{width}(currM)$$

A partial join estimate may generally be calculated for each merge region using this formula. The term |currA| represents the density of the current bucket of histogram A associated with the current merge region, i.e., currM. The term |currB| represents the density of the current bucket of histogram B associated with the current merge region. Buckets associated with the merge region refer to the buckets in histogram A and histogram B where the merge region is entirely within the bounds of the bucket and/or the merge region overlaps a portion of the bucket, e.g., the high range of the merge region is the same as the lower bound of a bucket of histogram A.

A density of the bucket may be determined by dividing a count of the bucket by the width of the bucket. The count of the bucket may be stored in an array, e.g., A.bucket_counts[ ], and may be read in block 64. Generally, A.bucket_counts[−1], B.bucket_counts[−1], A.bucket_counts[A.length], and B.bucket_counts[B.length] may be initialized to zero and may be updated when the value is read in. Typically, the count of the bucket represents the number of data values in the bucket, the width of the bucket represents the difference of the upper and lower bounds of the bucket, and the width of the merge region represents the difference of the high range and the low range of the merge region. The width of a bucket may need to be adjusted by increasing or decreasing the width by 1 based upon inclusiveness, adjacent exclusive regions, and/or how the histogram is stored.

The symbol "*" is referenced throughout the detailed description and represents multiplication. Thus, according to this formula, to generate a partial join estimate for the merge region, the density of currA is multiplied by the density of currB and multiplied by the width of the merge region.

Additionally, the partial join estimate calculated through the formula for each merge region may be combined with the total value, e.g., via addition. The total variable generally keeps a running sum of each partial join estimate generated for each merge region. Once the partial join estimate is generated for the first merge region, probably after two iterations of the loop, a partial join estimate may be generated with this formula during each subsequent iteration of the loop and added to the total value. When control eventually passes to block 80, the total value in block 80 will represent the join size estimate for the condition (A=B) and further adjustments to the total variable may not be appropriate for the condition (A=B).

Returning back to block 78, if the join size estimate sought is an estimate of the number of data values of Table A that are less than data values of Table B, a partial join estimate may be generated in block 78 for the merge region of block 77 based upon the following formula:

$$A<B: \text{foreach}(currM,M)\text{total}+= \frac{1}{2}*|currA|*|currB|*\text{width}(currM)*(\text{width}(currM)-1)$$

In particular, (width(currM)−1) is provided to exclude data values from the buckets of histogram A and histogram B associated with the merge region that are equal. A partial join estimate may generally be calculated for each merge region using this formula. The previous discussion in connection with blocks 77, 78, and/or 80 may be pertinent and applicable in part or its entirety.

Additionally, values for an accum variable and a prev variable may be calculated for each merge region in block 78 as the join size estimate sought is for an inequality. The accum variable is a running sum of the number of data values of Table A that are smaller then the low range of the merge region generally expressed as:

$$\text{foreach}(currM,M)\text{accum}(currA)+=|\text{prior}A|*\text{width}(\text{prior}M)$$

The value of the accum variable may be calculated for each merge region by multiplying together the density of the bucket of histogram A associated with the previous merge region, i.e., priorA, and the width of the previous merge region, i.e., priorM, and adding this product to the accum value. Generally, the accum allows routine 60 to occur in one pass when the join size estimate sought is an estimate of the number of data values of Table A that are less than data values of Table B. The prev value may be calculated by $$\text{foreach }(currM,M)\text{prev}: |currB|*\text{width}(currM)*\text{accum}(currA)$$

for each merge region. The prev value is the estimated cross product between data values of the bucket of the histogram of Table B associated with the merge region and the data values of the bucket of the histogram of Table A associated with the merge region from the accum. The values of accum and/or prev for the first merge region may be zero because there may be no values to base the calculation of accum and/or prev variables before the first merge region.

In particular, the partial join estimates calculated for each merge region of the loop may be combined with the total value, which keeps a running sum of each partial join estimate generated for each merge region. However, if it is determined in block 76 that the variable i equals A.length and the variable j equals B.length and control passes to block 80, the values of prev generated for each merge region may be added to the total variable in block 80. Thus, the prev variable may be used in the second part of the formula in connection with block 80. In particular, the prev values, which incorporates accum values, may be added to the total value in block 80. Thus, the join size estimate sought may be based upon the addition of the prev values and the total value. In other words, the sum of the prev values may be added to the sum of the partial join estimates, i.e., total, in block 80. Although block 80 may not be appropriate for a join size estimate of the data values of Table A that are equal to Table B, adjusting the total variable in block 80 may be appropriate for a join size estimate of data values of Table A that are less than Table B.

Furthermore, it is worth noting that those of ordinary skill in the art may appreciate that this formula may be similar to calculating the area of a triangle. In particular, the estimate may be arrived at by adding the overlap total (triangle) to the prev values (rectangle).

On the other hand, the join size estimate of the data values of Table A that are less than data values of Table B may be generally calculated for each merge region by increasing the total value by the prev value generated for the merge region instead of adding the values of prev to the total value in block 80. Thus, the running sum of partial join estimates of total may also incorporate a running sum of the prev values generated for each merge region. Therefore, the formula may alternatively be expressed as follows:

$A<B$: foreach($currM,M$)total+=
½*|$currA$|*|$currB$|*width($currM$)*(width($currM$)−1)+|$currB$|*width($currM$)*accum($currA$)

In particular, the total value may be increased with the prev value for each merge region generally during each iterations. Thus, at block 80, the total value may not need to be adjusted by the addition of the prev values. As a result, block 80 may be omitted in some embodiments consistent with the invention. Those of ordinary skill in the art may appreciate that the main difference between the formula expressed in two parts, i.e., total representing a running sum of partial join estimates generated for each merge region and adding all the values of prev generated for each merge region to the final total sum of partial join estimates, versus the single formula, i.e., for each merge region adding the partial join estimate and prev value to the total for each merge region, is where the prev values are added to the total. Moreover, those of ordinary skill in the art may become aware of other modifications that may be made to the formulas described herein, thus, the scope of the invention should not be limited to the specific embodiments herein.

Returning back to block 78, if the join size estimate sought is an estimate of the number of data values of Table A that are less than or equal to data values of Table B, then a partial join estimate may be generated in block 78 for the merge region of block 77 based upon the following formula:

$A<=B$: foreach ($currM,M$)total+=
½*|$currA$|*|$currB$|*width($currM$)*(width($currM$)−1)

Furthermore, all the values of prev generated for each merge region may be calculated by:

foreach($currM,M$)prev: |$currB$|*width($currM$)*accum($currA$)

and added to the value of total in block 80. In other words, a running sum of the prev value generated for each merge region may be maintained like the total variable and in block 80, the running sum of the prev value may be added to the total value to generate the join size estimate sought. For instance, the running sum of the prev values may be generated by:

foreach($currM,M$)prev+=|$currB$|*width($currM$)*accum($currA$)

The discussion of estimating a join size estimate for the number of data values of Table A less than data values of Table B may be applicable in part or its entirety. The primary difference in the formulas is the multiplication of the width of the merge region plus 1 instead of minus 1. Similarly, the discussion in connection with blocks 77, 78, and/or 80 are pertinent and may be applicable.

Furthermore, if thought of as a triangle, the join size estimate of the number of data values of Table A that are less than or equal to data values of Table B includes the hypotenuse of the triangle. Alternatively, the total may be updated with the value of prev generally during each iteration for each merge region by:

$A<=B$: foreach($currM,M$)total+=
½*|$currA$|*|$currB$|*width($currM$)*(width($currM$)+1)+|$currB$|*width($currM$)*accum($currA$)

Additionally, a partial join estimate of the number of data values of the bucket of histogram A associated with the merge region that are less than or equal to data values of the bucket of histogram B associated with the merge region may be determined by multiplying the cross product of the regions or buckets of the first and second histograms associated with the merge region as follows:

$A<=B$:100% [Cross Product($A,B$)]−($A>B$)

In particular,

Cross Product($A, B$)=$f(A<B)+f(A=B)+f(A>B)$

The cross product may be determined by adding three partial join estimates for the merge region, mainly, a partial join estimate of the number of data values of the bucket of histogram A associated with the merge region that are less than, equal to, and more than data values of the bucket of histogram B associated with the merge region. Those of ordinary skill in the art may appreciate that more than one total variable may be used, e.g., one total variable for ($A<B$), one total variable for ($A=B$), and/or one total variable for ($A>B$). Furthermore, those of ordinary skill in the art may appreciate that this formula may be used to generate the join size estimate sought by combining the individual totals i.e., adjusted total or unadjusted total, according to the formula in block 80.

Similarly, the partial join estimate of the number of data values of the bucket of histogram A associated with the merge region that are less than and/or equal to data values of the bucket of histogram B associated with the merge region may be determined by:

$A<=B$: $(A<B)+(A=B)$

Thus, for each merge region, partial join estimate of data values of the bucket of histogram A associated with the merge region that are less than data values of the bucket of histogram B associated with the merge region, and a partial join estimate of data values of the bucket of histogram A associated with the merge region are equal to data values of the bucket of histogram B associated with the merge region may be added. Those of ordinary skill in the art may appreciate that more than one total variable may be used, e.g., one total variable for ($A<B$) and/or one total variable for ($A=B$). Furthermore, those of ordinary skill in the art may appreciate that this formula may be used to generate the join size estimate sought by combining the individual totals of partial join estimates, e.g., adjusted total for $A<B$ or unadjusted total for $A=B$, according to the formulas $A<=B$: ($A<B$)+($A=B$) and/or $A<=B$: 100% [Cross Product(A,B)]−($A>B$) in block 80.

Returning back to block 78, if the join size estimate sought is an estimate of the number of data values of Table A that are more than data values of Table B, then a partial join estimate may be generated in block 78 for the merge region of block 77 by substituting the variables of the less than formula, including the second portion of the formula discussed in connection to block 80. Thus, the previous discussion in connection with blocks 77, 78, and/or 80 may be pertinent and applicable in part or its entirety. In particular, the partial join estimates may be determined by:

$A>B$: foreach($currM,M$)total+=
½*|$currB$|*|$currA$|*width($currM$)*(width($currM$)−1)

and adding the values of prev generated for each merge region to the total in block 80 using:

foreach($currM,M$)prev: |$currA$|*width($currM$)*accum($currB$)wherein accum($currB$)+=|$priorB$|*width($priorM$)

or foreach($currM,M$)prev+=|$currA$|*width($currM$)*accum($currB$)wherein accum($currB$)+=|$priorB$|*width($priorM$)

Alternatively, the formula may be generally expressed as:

$A>B$: foreach(currM,M)total+=
½*|currB|*|currA|*width(currM)*(width(currM)−1)+|currA|*width(currM)*accum(currB)

Returning back to block 78, if the join size estimate sought is an estimate of the number of data values of Table A that are more than or equal to data values of Table B, then a partial join estimate may be generated in block 78 for the merge region of block 77 by substituting the variables in the three techniques to estimate the join size of data values of Table A that are less than or equal to data values of Table B. Similarly, the discussion in connection with the less than or equal to formula hereinabove may be pertinent, furthermore, the previous discussion in connection with blocks 77, 78, and/or 80 may be pertinent and applicable in part or its entirety.

In particular, the partial join estimates may be determined by:

$A>=B$: foreach(currM,M)total+=
½*|currB|*|currA|*width(currM)*(width(currM)+1)

and adding the values of prev generated for each merge region to the total in block 80 using:

foreach(currM,M)prev: |currA|*width(currM)*accum(currB)wherein accum(currB)+=|priorB|*width(priorM)

or foreach(currM,M)prev+=|currA|*width(currM)*accum(currB)wherein accum(currB)+=|priorB|*width(priorM)

Alternatively, the formula may be generally expressed as:

$A>=B$: foreach(currM,M)total+=
½*|currB|*|currA|*width(currM)*(width(currM)+1)+|currA|*width(currM)*accum(currB)

Moreover, the formulas:

$A>=B$: $(B<A)+(B=A)$ and/or

100% [Cross Product$(B,A)$]−$(B>A)$ may be used to generate both the partial join estimates for each merge region.

Those of ordinary skill in the art may appreciate the ability to add and subtract these formulas and substitute variables, and yet, errors may not be introduced. As an example, if there was already an join size estimate for A<B as well as a join size result for A=B, whereas traditionally it may not have been sound to combine the previously calculated join size estimates together to generate join size estimate for A>B because it may result in a negative value or a value close to 0. In the herein-described embodiments, however, where the calculations are robust, the join size estimate for A>B may be reliably calculated as|cross product|−|A<B|−|A=B| consistent with the present invention. Furthermore, the property f(A<B)=f(B<A) may also be used for a merge region, without the accum variable. Moreover, those of ordinary skill in the art may appreciate that changes may be made to routine 60 in FIG. 3 and/or the formulas.

The following examples illustrate the advantages of the illustrated embodiments. As an overview, in the first example, a plurality of join size estimates for Table A and Table B are displayed in Chart III as well as the merge regions, partial join estimates, accum and prev values that may be determined during the iterations of routine 60. In particular, the Data of Table A column in Chart I contains the actual data values of Table A, while the rest of the columns in Chart I describe the histogram of Table A. The Lower Bound and Upper Bound columns describe the bounds of the buckets (i.e., each row in Chart I generally represents a bucket) of the histogram of Table A, and the Count column illustrates the number of elements in each bucket. The value of first lower bound, all the upper bounds and the counts may be stored, but need not be consistent with the invention. For simplicity, the values that may be stored are designated by the follow sympol: ^. Similarly, Chart II illustrates the data values of Table B and describes the histogram of Table B.

CHART I

| Data of Table A | Lower Bound | Upper Bound | Count |
|---|---|---|---|
| 1, 2, 3 | 0^ | 3^ | 3^ |
| 5, 6, 7, 8 | 3 | 8^ | 4^ |
| 10, 11, 12 | 8 | 12^ | 3^ |

CHART II

| Data of Table B | Lower Bound | Upper Bound | Count |
|---|---|---|---|
| 0, 1, 4, 7 | −1^ | 7^ | 4^ |
| 9, 8, 16, 32 | 7 | 32^ | 4^ |

Next, Chart III details the intermediate data involved in figuring out a join size estimate. The Merge Region column specifies the different merge regions generated from the buckets of histogram A and/or histogram B, and their low and high ranges, e.g., the range of the first merge region in Chart III is (−1,0] where the −1 is exclusive low range and the 0 is inclusive high range. In particular, the ranges of the Merged Region in Chart III are based upon the bounds of the buckets of the histogram of Table A, i.e., 0, 3, 8, 12, and the bounds of the buckets of the histogram of Table B, i.e., −1, 7, 32. The |A| and |B| columns illustrate the densities (e.g., the count of the bucket of Table A associated with the merge region divided by the width of the bucket) of the buckets of histograms A and B associated with the merge region, respectively.

The Accum or Accumulator and the Prev or Previous values may be calculated for each merge region, but may not be used in the join size estimation of the equality, instead, the accum and prev values may be used in the formulas of the two inequalities illustrated (i.e., less than and less than or equal to). As previous described, the Accum is the estimate of how many Table A values are smaller then the lower bound of the merge region while Prev is the estimated cross product between the Table B values in the current merge region and the Table A values in from the Accum. The columns <.=, and <= are the Triangle calculations. Furthermore, each row of the <.=, and <= columns illustrate a partial join estimate. Moreover, each partial join estimate may be combined via the total variable associated with that join size estimate, e.g., a first total variable for the join size estimate for <, a second total variable for the join size estimate for =, and a third total variable with the join size estimate for <=. Additionally, the prev values may be combined with the total variable of any of the inequalities as described above.

CHART III

JOIN SIZE ESTIMATES FOR A JOIN BETWEEN Table A and Table B

| Merge Region | |A| | |B| | Width | Accum | Prev | < | = | <= |
|---|---|---|---|---|---|---|---|---|
| (−1, 0] | 0 | .5 | 1 | 0 | 0 | 0 | 0 | 0 |
| (0, 3] | 1 | .5 | 3 | 0 | 0 | 1.5 | 1.5 | 3 |
| (3, 7] | .8 | .5 | 4 | 3 | 6 | 2.4 | 1.6 | 4 |
| (7, 8] | .8 | .16 | 1 | 6.2 | 0.992 | 0 | 0.128 | 0.128 |
| (8, 12] | .75 | .16 | 4 | 7 | 4.48 | 0.72 | 0.48 | 1.2 |
| (12, 32] | 0 | .16 | 20 | 10 | 32 | 0 | 0 | 0 |
| | | | | | 43.472 | Totals: 4.62 | Totals: 3.708 | Totals: 8.328 |
| | | | | | join size estimate 48.092 | | 3.708 | 51.8 |

Referring to Chart III, the Merge Regions depicted in the Merge Region column of Chart III may be generated using the previously mentioned technique for generating merge regions. For instance, initially, A.upper[−1] may point to the lower bound of the first bucket of histogram A, mainly the 0 value, and B.upper[−1] may point to the lower bound of the first bucket of histogram B, mainly the −1 value. Upon comparing 0 and −1, the lowest bound value is −1. Thus, the j variable in the B.upper[j] array may be increased by one to 0, and the lowest bound value of −1 may become the low range of the first merge region. As the merge region is not complete, the calculation of a partial join estimate may be postponed to the second iteration of the loop.

During the second iteration, the bound values represented by A.upper[−1] and B.upper[0] may be compared. The value of A.upper[−1] is lower; thus the lowest bound value during the second iteration is 0. The i variable of A.upper[i] array may be increased by one and the lowest bound value of 0 may become the high range value of the first merge region. Next, the formula(s) may be applied to generate a partial join estimate (or multiple partial join estimate as illustrated in Chart III), described in more detail below, and if all the bounds of the buckets of histogram A and B have not been processed, generally identified by comparing the i and j variables to the length of histogram A and B respectively, another iteration of the loop may occur. Thus, during the third iteration, the high range value of the previous merge region, i.e., (−1,0], may be the low range value of the second merge region of the third iteration and the high range value of the second merge region of the third iteration may be the next lowest bound value, i.e., 3, determined by comparing A.upper[0] and B.upper[0]. Additionally, the variable i may be incremented and a partial join estimate calculated for the merge region (0,3] using the formula(s) and so on. Thus, the techniques outlined in routine 60 may be implemented and may result in the values illustrated in Chart III.

Now, some of the intermediate values and partial join estimates will be described in more detail; however, the discussion will start with the third row of Chart III as the multitude of zero values in the first and second rows are not particularly illustrative. Thus, starting with the third row, |A| or the density of the bucket of the histogram of Table A associated with the merge region (3, 7] may be calculated. In particular, the bucket 3 to 8 in the histogram of Table A is the one associated with the merge region as the merge region overlaps with that bucket, (i.e., the value 3 overlaps). Specifically, the count (i.e., 4) of the bucket may be divided by the difference between the upper bound and the lower bound of the bucket (i.e., 8−3=5), resulting in the density of 0.8(i.e., 4/8−3=4/5=0.8). Next, to calculate |B|, one looks at the count of the bucket in Table B's histogram associated with the merge region. The merge region (3,7] overlaps with the bucket of histogram B with bounds −1 and 7. Thus, the associated bucket has bounds of −1 and 7 and the count of the associated bucket (i.e., 4) is divided by difference between the upper bound and the lower bound of the associated bucket (i.e., 7−−1=8), resulting in the value 0.5 (i.e., 4/7−−1=4/8=0.5), illustrated in the third row of column |B|.

The value of 4 in the Width column illustrates that difference between the high range and low range of the merge region. In other words, generally 4 values may satisfy the (3, 7] merge region, mainly the values 3, 4, 5, and 6 may satisfy it but not the value 7. There may be an infinite number of floating point values between 3 and 7, but for simplicity, whole numbers are used.

Next, turning to the Accum column, the Accum value may be determined by multiplying the |A| value of the row before it (i.e. 1) times the width of the merge region of the row before it (i.e., 3) and adding the product to the Accum value of the row before it (i.e., 0), resulting in an estimate of the number of data values of Table A that are lower than the lowest bound (i.e., 3) of the current merge region. Thus, it is estimated that 3 data values (i.e., 3*1+0=3) of Table A are lower than the value 3. Prev indicates the estimated cross product of data values of Table B for the current merge region and the number of data values from Table A from the Accum, and may be calculated by multiplying the current Accum value (i.e., 3) times the current width of the merge region (3, 7] (i.e., 4) times |B| (i.e., 0.5), resulting in an estimated cross product of 6.

Next, the calculated values just described may be plugged into the previous mentioned formulas to estimate a partial join estimate. Returning to the third row, the values of |A|, |B|, and the width may multiplied together to estimate the number of data values in Table A that are equal to data value in Table B for the range of values 3 to 7. Thus, 0.8*0.5*4 yields an estimate of 1.6 for that merge region. To estimate how many data values of Table A are equal to data values of Table B as a whole, all the partial join estimate under the =column generated for each merge region may be added to the total variable (not illustrated) during each iteration of the loop. Thus, the resulting join size estimate is 3.708, illustrated in the row labeled totals. Additionally, as this is not an inequality, the value of total in block 80 represents the join size estimate and generally does not need to be adjusted.

Next, in order to arrive at the partial join estimates for the < and <= columns, the values described above may be plugged into the < and the <= formulas. First, assuming the formulas are separated into two parts. With regards to the first part, returning to the third row, with respect to the data values of Table A within the merge region (3, 7] that are less than the data values of Table B for that same range, one half multiplied by the values of |A|, |B|, the Width of the merge region, and the Width of the merge region minus 1 (i.e., ½*0.8*0.5*4*3=2.4) results in a partial join estimate of 2.4.

Similarly, returning to the third row, with respect to the data values of Table A within the merge region (3, 7] that are less than or equal to the data values of Table B for that same range, one half multiplied by the values of |A|, |B|, the Width of the merge region, and the Width of the merge region plus one (i.e., ½*0.8*0.5*4*5=4) results in a partial join estimate of 4. Furthermore, the previously calculated estimates of <(i.e., 2.4) and =(1.6) estimating the partial join estimates of data values in the merge region (3, 7] may be added together producing an estimate of 4. Also, plugging the generated values into 100% [Cross Product(A,B)]−(A>B)] would similarly result in an estimate of 4.

As illustrated in the final join size estimate row of Chart III, the second part of each < and <= formula was implemented. In particular, looking at the final join size estimates of Chart III, the total values represent the addition of the partial join estimates from the first part of the formulas, and then all the values of prev, i.e., the sum of prev values 43.472, from the prev value column are added to the total of partial join estimates for A<B and A<=B, 4.62 and 8.328, respectively. Thus, the join size estimate for data values of Table A that are less than data values of Table B is 48.092 and the join size estimate for data values of Table A less than or equal to data values of Table B is 51.8.

Alternatively, the prev value generated for the third merge region illustrated in the third row, i.e., 6, may be added to the running total of partial join estimates of each inequality, i.e., 0+1.5+2.4+6=8.4 and 0+3+4+6=10. Similarly, the next prev value, i.e., 0.992, generated for the fourth merge region and the next corresponding partial join estimate may be added to each running total, i.e., 8.4+0+0.992=9.392 and 10+0.128+ 0.992=11.12, and so on. Generally, this should produce the same join size estimates as if the formula had been applied in two parts.

ciate that the join size estimates of 48.092, 3.708, and 51.8 indicated in Chart III appear to be useful join size estimates. Additionally, it is worthwhile to note that the join estimates (and actual values) for A<B and A=B add up to A<=B, i.e., 48.092+3.708=51.8.

Next, referring to the second example, as in the first example above, a plurality of partial join estimates for Table A and Table C are displayed in Chart V. First, Chart I (above) and Chart IV each display the actual data in Table A and Table C and describe the histogram of each table, respectively. As in the first example, the values with the symbol ^, specifically the first lower bound, the upper bounds, and the count of each histogram bucket may be stored.

CHART IV

| Data of Table C | Lower Bound | Upper Bound | Count |
|---|---|---|---|
| 4, 4, 4, 5 | 3^ | 5^ | 4^ |
| 5, 5, 5, 6 | 5 | 6^ | 4^ |

Next, the lower and upper bounds indicated in Chart I and Chart IV may be used to generate a plurality of merge regions as indicated below in the Merge Region column in Chart V. The same formulas and corresponding calculations may be implemented to arrive at the partial join estimates for each merge region and final join size estimates indicated in Chart V. In particular, the estimated total join size of data values of Table A less than data values of Table B is 32, the estimated total join size of data values of Table A equal to data values of Table B is 6.4, and the estimated total join size of data values of Table A less than or equal to data values of Table B is 38.4.

CHART V

| Merge Region | |A| | |C| | Width | Accum | Prev | < | = | <= |
|---|---|---|---|---|---|---|---|---|
| (0, 3] | 1 | 0 | 3 | 0 | 0 | 0 | 0 | 0 |
| (3, 5] | .8 | 2 | 2 | 3 | 12 | 1.6 | 3.2 | 4.8 |
| (5, 6] | .8 | 4 | 1 | 4.6 | 18.4 | 0 | 3.2 | 3.2 |
| (6, 8] | .8 | 0 | 2 | 5.4 | 0 | 0 | 0 | 0 |
| (8, 12] | .75 | 0 | 4 | 7 | 0 | 0 | 0 | 0 |
| | | | | 30.4 | | Totals: 1.6 | Totals: 6.4 | Totals: 8 |
| | | | | | join size estimate | 32 | 6.4 | 38.4 |

JOIN SIZE ESTIMATES FOR A JOIN BETWEEN Table A and Table C

Those of ordinary skill in the art may appreciate that, although the actual number of data values from Table A that are less than, equal, and/or less than or equal to may not be known until after a database query is executed, which is generally why join size estimates are generated prior to execution of the database query. However, looking at the actual number of values matching the criteria, i.e., 41, 3, and 44 respectively, those of ordinary skill in the art may appre- Furthermore, by reversing the variables, i.e., A and C, and performing the calculations for A>C and A>=C, final join size estimates of 41.6 and 48 my be generated for A>C and A>=C respectively. Moreover, those of ordinary skill in the art may appreciate that the sum of the estimates for A<C and A>=C is 80 and so are the sum of the estimates for A<=C and A>C. Moreover, as 80 is the size of the cross product for the join (10 data value in Table A multiplied by 8 data values in Table B resulting in 80 which is 80=>80), this generally shows that the formulas are consistent.

Various modifications may be made to the illustrated embodiments without departing from the spirit and scope of the invention. Therefore, the invention lies in the claims hereinafter appended.

What is claimed is:

1. A method of estimating a join size for first and second tables, the method comprising, in a computer including a hardware-implemented processor:
   (a) determining a plurality of merge regions from first and second histograms respectively associated with the first and second tables, wherein each histogram includes a plurality of regions, and wherein each merge region overlaps a region from at least one of the first or the second histograms;
   (b) for each merge region, calculating a partial join estimation for such merge region, wherein calculating the partial join estimation includes scaling a density for any region of the first and second histograms associated with the merge region by a width associated with such merge region; and
   (c) combining the partial join estimations,
   wherein calculating the partial join estimation for the merge region includes calculating a partial join estimation used in estimating a join size for the first and second tables meeting a condition A<B wherein the condition A<B is indicative of a number of data values in the first table that are less than data values in the second table using at a formula:

$$\frac{1}{2} * |currA| * |currB| * \text{width}(currM) * (\text{width}(currM) - 1) + |currB| * \text{width}(currM) * \text{accum}(currA)$$

where |currA| is the density of the region from the first histogram associated with the merge region, |currB| is the density of the region from the second histogram associated with the merge region, width(currM) is the width of the merge region, and the accum(currA) is an estimate of the number of data values in the first table that are smaller than a lower range of the merge region.

2. The method of claim 1, wherein calculating the partial join estimation for the merge region includes calculating a partial join estimation used in estimating a join size for the first and second tables meeting a condition A<=B wherein the condition A<=B is indicative of a number of data values in the first table that are less than or equal to data values in the second table using a formula:

$$\frac{1}{2} * |currA| * |currB| * \text{width}(currM) * (\text{width}(currM) + 1) + |currB| * \text{width}(currM) * \text{accum}(currA)$$

where |currA| is the density of the region from the first histogram associated with the merge region, |currB| is the density of the region from the second histogram associated with the merge region, width(currM) is the width of the merge region, and the accum(currA) is an estimate of the number of data values in the first table that are smaller than a lower range of the merge region.

3. The method of claim 1, wherein calculating the partial join estimation for the merge region includes calculating a partial join estimation used in estimating a join size for the first and second tables meeting a condition A<=B wherein the condition A<=B is indicative of a number of data values in the first table that are less than or equal to data values in the second table using a formula:

$$(A<B)+(A=B)$$

where (A<B) is a first partial join estimation and (A=B) is a second partial join estimation.

4. The method of claim 1, wherein calculating the partial join estimation for the merge region includes calculating a partial join estimation used in estimating a join size for the first and second tables meeting a condition A<=B wherein the condition A<=B is indicative of a number of data values in the first table that are less than or equal to data values in the second table using a formula:

$$[\text{Cross Product}(A,B)]-(A<B)$$

where the Cross Product(A,B) represents the addition of the following three partial join estimations: (A<B), (A=B), and (A>B).

5. The method of claim 1, wherein calculating the partial join estimation for the merge region includes calculating a partial join estimation used in estimating a join size for the first and second tables meeting a condition A>B wherein the condition A>B is indicative of a number of data values in the first table that are greater than data values in the second table using a formula:

$$\frac{1}{2} * |currB| * |currA| * \text{width}(currM) * (\text{width}(currM) - 1) + |currA| * \text{width}(currM) * \text{accum}(currB);$$

where |currA| is the density of the region from the first histogram associated with the merge region, |currB| is the density of the region from the second histogram associated with the merge region, width(currM) is the width of the merge region, and the accum(currB) is an estimate of the number of data values in the second table that are smaller than a lower range of the merge region.

6. The method of claim 1, wherein calculating the partial join estimation for the merge region includes calculating a partial join estimation used in estimating a join size for the first and second tables meeting a condition A>=B wherein the condition A>=B is indicative of a number of data values in the first table that are greater than or equal to data values in the second table using a formula:

$$\frac{1}{2} * |currB| * |currA| * \text{width}(currM) * (\text{width}(currM) + 1) + |currA| * \text{width}(currM) * \text{accum}(currB);$$

where |currA| is the density of the region from the first histogram associated with the merge region, |currB| is the density of the region from the second histogram associated with the merge region, width(currM) is the width of the merge region, and the accum(currB) is an estimate of the number of data values in the second table that are smaller than a lower range of the merge region.

7. The method of claim 1, wherein calculating the partial join estimation for the merge region includes calculating a partial join estimation used in estimating a join size for the first and second tables meeting a condition A>=B wherein the condition A>=B is indicative of a number of data values in the first table that are greater than or equal to data values in the second table using a formula:

$$(B<A)+(B=A)$$

where (B<A) is a first partial join estimation and (B=A) is a second partial join estimation.

8. The method of claim 1, wherein calculating the partial join estimation for the merge region includes calculating a partial join estimation used in estimating a join size for the first and second tables meeting a condition A>=B wherein the condition A>=B is indicative of a number of data values in the first table that are greater than or equal to data values in the second table using a formula:

[Cross Product(B,A)]−(B>A)

where the Cross Product(B,A) represents the addition of the following three partial join estimations: (B<A), (B=A), and (B>A).

9. An apparatus, comprising:
   at least one processor;
   a memory; and
   program code resident in the memory and configured to be executed by the at least one processor to estimate a join size for first and second tables by determining a plurality of merge regions from first and second histograms respectively associated with the first and second tables, wherein each histogram includes a plurality of regions, and wherein each merge region overlaps a region from at least one of the first or second histograms, for each merge region, calculating a partial join estimation for such merge region, wherein calculating the partial join estimation includes scaling a density for any region of the first and second histograms associated with the merge region by a width associated with such merge region, and combining the partial join estimations, the program code configured to calculate the partial loin estimation for the merge region includes calculating a partial join estimation used in estimating a join size for the first and second tables meeting a condition A<B wherein the condition A<B is indicative of a number of data values in the first table that are less than data values in the second table using a formula:

½*|currA|*|currB|*width(currM)*(width(currM)−1)+|currB|*width(currM)*accum(currA)

where |currA| is the density of the region from the first histogram associated with the merge region, |currB| is the density of the region from the second histogram associated with the merge region, width(currM) is the width of the merge region, and the accum(currA) is an estimate of the number of data values in the first table that are smaller than a lower range of the merge region.

10. The apparatus of claim 9, the program code configured to calculate the partial join estimation for the merge region includes calculating a partial join estimation used in estimating a join size for the first and second tables meeting a condition A<=B wherein the condition A<=B is indicative of a number of data values in the first table that are less than or equal to data values in the second table using a formula:

½*|currA|*|currB|*width(currM)*(width(currM)+1)+|currB|*width(currM)*accum(currA)

where |currA| is the density of the region from the first histogram associated with the merge region, |currB| is the density of the region from the second histogram associated with the merge region, width(currM) is the width of the merge region, and the accum(currA) is an estimate of the number of data values in the first table that are smaller than a lower range of the merge region.

11. The apparatus of claim 9, the program code configured to calculate the partial join estimation for the merge region includes calculating a partial join estimation used in estimating a join size for the first and second tables meeting a condition A<=B wherein the condition A<=B is indicative of a number of data values in the first table that are less than or equal to data values in the second table using a formula:

(A<B)+(A=B)

where (A<B) is a first partial join estimation and (A=B) is a second partial join estimation.

12. The apparatus of claim 9, the program code configured to calculate the partial join estimation for the merge region includes calculating a partial join estimation used in estimating a join size for the first and second tables meeting a condition A<=B wherein the condition A<=B is indicative of a number of data values in the first table that are less than or equal to data values in the second table using a formula:

[Cross Product(A,B)]−(A>B)

where the Cross Product(A,B) represents the addition of the following three partial join estimations: (A<B), (A=B), and (A>B).

13. The apparatus of claim 9, the program code configured to calculate the partial join estimation for the merge region includes calculating a partial join estimation used in estimating a join size for the first and second tables meeting a condition A>B wherein the condition A>B is indicative of a number of data values in the first table that are greater than data values in the second table using a formula:

½*|currB|*|currA|*width(currM)*(width(currM)−1)+|currA|*width(currM)*accum(currB);

where |currA| is the density of the region from the first histogram associated with the merge region, |currB| is the density of the region from the second histogram associated with the merge region, width(currM) is the width of the merge region, and the accum(currB) is an estimate of the number of data values in the second table that are smaller than a lower range of the merge region.

14. The apparatus of claim 9, the program code configured to calculate the partial join estimation for the merge region includes calculating a partial join estimation used in estimating a join size for the first and second tables meeting a condition A>=B wherein the condition A>=B is indicative of a number of data values in the first table that are greater than or equal to data values in the second table using a formula:

½*|currB|*|currA|*width(currM)*(width(currM)+1)+|currA|*width(currM)*accum(currB);

where |currA| is the density of the region from the first histogram associated with the merge region, |currB| is the density of the region from the second histogram associated with the merge region, width(currM) is the width of the merge region, and the accum(currB) is an estimate of the number of data values in the second table that are smaller than a lower range of the merge region.

15. The apparatus of claim 9, the program code configured to calculate the partial join estimation for the merge region includes calculating a partial join estimation used in estimating a join size for the first and second tables meeting a condition A>=B wherein the condition A>=B is indicative of a number of data values in the first table that are greater than or equal to data values in the second table using at least a portion of formula:

(B<A)+(B=A)

where (B<A) is a first partial join estimation and (B=A) is a second partial join estimation.

16. The apparatus of claim 9, the program code configured to calculate the partial join estimation for the merge region includes calculating a partial join estimation used in estimating a join size for the first and second tables meeting a condition A>=B wherein the condition A>=B is indicative of a number of data values in the first table that are greater than or equal to data values in the second table using a formula:

$$[\text{Cross Product}(B,A)] - (B>A)$$

where the Cross Product(B,A) represents the addition of the following three partial join estimations: (B<A), (B=A), and (B>A).

* * * * *